United States Patent
Nishizawa et al.

(10) Patent No.: US 9,505,650 B2
(45) Date of Patent: Nov. 29, 2016

(54) NON-ALKALI GLASS SUBSTRATE

(71) Applicant: ASAHI GLASS COMPANY, LIMITED, Chiyoda-ku (JP)

(72) Inventors: Manabu Nishizawa, Tokyo (JP); Akio Koike, Tokyo (JP); Hirofumi Tokunaga, Tokyo (JP)

(73) Assignee: ASAHI GLASS COMPANY, LIMITED, Chiyoda-ku (JP)

( * ) Notice: Subject to any disclaimer, the term of this patent is extended or adjusted under 35 U.S.C. 154(b) by 0 days.

(21) Appl. No.: 14/648,779

(22) PCT Filed: Dec. 2, 2013

(86) PCT No.: PCT/JP2013/082365
§ 371 (c)(1),
(2) Date: Jun. 1, 2015

(87) PCT Pub. No.: WO2014/087971
PCT Pub. Date: Jun. 12, 2014

(65) Prior Publication Data
US 2015/0299028 A1  Oct. 22, 2015

(30) Foreign Application Priority Data
Dec. 5, 2012 (JP) ................. 2012-266106

(51) Int. Cl.
*C03C 3/091* (2006.01)

(52) U.S. Cl.
CPC .................. *C03C 3/091* (2013.01)

(58) Field of Classification Search
CPC .................................... C03C 3/091
See application file for complete search history.

(56) References Cited

U.S. PATENT DOCUMENTS

| | | | |
|---|---|---|---|
| 5,116,789 A | 5/1992 | Dumbaugh, Jr. et al. | |
| 6,096,670 A | 8/2000 | Lautenschlager et al. | |
| 8,431,503 B2 | 4/2013 | Nagai et al. | |
| 9,193,622 B2 * | 11/2015 | Tsujimura | C03C 3/091 |
| 2007/0191207 A1 | 8/2007 | Danielson et al. | |
| 2011/0048074 A1 | 3/2011 | Danielson et al. | |
| 2011/0143908 A1 | 6/2011 | Koyama et al. | |
| 2013/0065747 A1 | 3/2013 | Danielson et al. | |
| 2013/0244859 A1 | 9/2013 | Kawaguchi et al. | |
| 2013/0274086 A1 | 10/2013 | Tsujimura et al. | |
| 2013/0288877 A1 | 10/2013 | Tsujimura et al. | |
| 2013/0345041 A1 | 12/2013 | Koyama et al. | |
| 2014/0038807 A1* | 2/2014 | Tsujimura | C03C 3/091 501/66 |
| 2014/0083139 A1 | 3/2014 | Ando et al. | |
| 2014/0243186 A1 | 8/2014 | Danielson et al. | |
| 2015/0045203 A1* | 2/2015 | Tokunaga | C03C 3/091 501/67 |
| 2015/0087495 A1* | 3/2015 | Nishizawa | C03C 3/093 501/67 |
| 2015/0093561 A1* | 4/2015 | Tokunaga | C03C 3/091 428/220 |
| 2016/0002095 A1* | 1/2016 | Tsujimura | C03C 3/091 501/66 |

FOREIGN PATENT DOCUMENTS

| | | |
|---|---|---|
| CN | 101400614 A | 4/2009 |
| JP | 4-175242 A | 6/1992 |
| JP | 5-232458 | 9/1993 |
| JP | 9-263421 A | 10/1997 |
| JP | 10-45422 A | 2/1998 |
| JP | 11-157869 A | 6/1999 |
| JP | 2001-172041 A | 6/2001 |
| JP | 2011-126728 A | 6/2011 |
| JP | 2012-41217 A | 3/2012 |
| WO | WO 2012/161273 A1 | 11/2012 |

OTHER PUBLICATIONS

Machine translation of JP 09-263421, Oct. 7, 1997.*
International Search Report issued Mar. 11, 2014 in PCT/JP2013/082365 filed Dec. 2, 2013.

* cited by examiner

*Primary Examiner* — Elizabeth A Bolden
(74) *Attorney, Agent, or Firm* — Oblon, McClelland, Maier & Neustadt, L.L.P.

(57) ABSTRACT

The present invention relates to a non-alkali glass substrate, having a strain point of 685° C. or higher and 750° C. or lower, an average thermal expansion coefficient at 50 to 350° C. of from $35 \times 10^{-7}$ to $43 \times 10^{-7}$/° C., a specific gravity of from 2.50 to 2.80, a photoelastic constant of 25 nm/MPa/cm or more and less than 29 nm/MPa/cm, and a temperature ($T_4$) at which viscosity reaches $10^4$ dPa·s of 1,250° C. or higher and lower than 1,350° C., and having a prescribed composition.

8 Claims, No Drawings

NON-ALKALI GLASS SUBSTRATE

TECHNICAL FIELD

The present invention relates to a non-alkali glass substrate; and more detail, to a non-alkali glass substrate that is suitable as a substrate glass for various displays and a substrate glass for a photomask, does not substantially contain an alkali metal oxide and is capable of being formed by a float process or by an overflow down-draw process.

BACKGROUND ART

Heretofore, a glass plate (glass substrate) used for various displays, particularly a glass substrate used for a glass plate on which surface a metal or oxide thin film is formed, has been required to have the following characteristics:
(1) Not substantially containing alkali metal ions; because in the case where the glass contains an alkali metal oxide, alkali metal ions diffuse in the thin film, resulting in deterioration of film characteristics.
(2) Having a high strain point so that deformation of a glass plate and shrinkage (thermal shrinkage) due to structure stabilization of the glass can be minimized when exposed to high temperature in a thin film formation step.
(3) Having sufficient chemical durability against various chemicals used in semiconductor formation; in particular, having durability against buffered hydrofluoric acid (BHF: mixed liquid of hydrofluoric acid and ammonium fluoride) for etching $SiO_x$ or $SiN_x$, against a chemical solution containing hydrochloric acid used for etching of ITO, against various acids (nitric acid, sulfuric acid, etc.) used for etching of an metal electrode, and against an alkaline of a resist removing liquid.
(4) Having no defects (bubbles, striae, inclusions, pits, flaws, etc.) in the inside and on the surface.

In addition to the above requirements, the recent situations are as follows.
(5) Reduction in weight of a display is required, and the glass itself is also required to be a glass having a small density.
(6) Reduction in weight of a display is required, and a decrease in thickness and improvement of Young's modulus of the glass plate is desired.
(7) In addition to conventional amorphous silicon (a-Si) type liquid crystal displays, polycrystal silicon (p-Si) type liquid crystal displays requiring a slightly high heat treatment temperature have come to be produced (a-Si: about 350° C.→p-Si: 350 to 550° C.) and thus, thermal resistance is required.
(8) In order to improve productivity and increase thermal shock resistance by increasing the rate of rising and falling temperature in heat treatment for preparation of a liquid crystal display, a glass having a small average thermal expansion coefficient is required.

On the other hand, small and medium-sized displays for mobile as typified by a smartphone have progressed in high definition and thus, the above demands have become more and more strict.

For example, there are non-alkali glasses proposed in the Patent Documents 1 to 3.

PRIOR ART DOCUMENTS

Patent Documents

Patent Document 1: JP-A-2001-172041
Patent Document 2: JP-A-H5-232458
Patent Document 3: JP-A-2012-41217

SUMMARY OF THE INVENTION

Problems that the Invention is to Solve

Patent Document 1 discloses a non-alkali glass having a low photoelastic constant, but due to low viscous properties at the devitrification temperature and high forming temperature, there is a limitation in the production method thereof, or there are problems that requirements for a low specific gravity, a high strain point, a low average thermal expansion coefficient and the like cannot be satisfied.

Patent Document 2 discloses a non-alkali glass that contains 0 to 5 mol % of $B_2O_3$ and further contains BaO, but the average thermal expansion coefficient thereof is high.

Patent Document 3 discloses a non-alkali glass that contains 0.1 to 4.5% by mass of $B_2O_3$ and contains 5 to 15% by mass of BaO, but the average thermal expansion coefficient thereof is high.

At the time of embedding a display into a panel, there is a problem of color unevenness caused by a stress generated in a glass plate. In order to suppress the color unevenness, it is necessary to reduce the photoelastic constant of the glass, and therefor, it is effective to reduce the content of $B_2O_3$ or to increase the content of BaO in the glass.

An object of the present invention is to solve the above-described problems. That is, there is provided a non-alkali glass substrate that has a high strain point, a low specific gravity, a low photoelastic constant, and a high Young's modulus, and hardly causes problems such as color unevenness even when stress is applied thereto.

Means for Solving the Problems

The present invention provides a non-alkali glass substrate 1, having a strain point of 685° C. or higher and 750° C. or lower, an average thermal expansion coefficient at 50 to 350° C. of from $35 \times 10^{-7}$ to $43 \times 10^{-7}$/° C., a specific gravity of from 2.50 to 2.80, a photoelastic constant of 25 nm/MPa/cm or more and less than 29 nm/MPa/cm, and a temperature ($T_4$) at which viscosity reaches $10^4$ dPa·s of 1,250° C. or higher and lower than 1,350° C., and containing, indicated by mol % on the basis of oxides,
  63% or more and 68% or less of $SiO_2$,
  12.2% or more and 14% or less of $Al_2O_3$,
  0.5% or more and less than 3% of $B_2O_3$,
  6.5% or more and 13% or less of MgO,
  0% or more and 4% or less of CaO,
  0% or more and 9% or less of SrO, and
  0% or more and 10% or less of BaO,
  in which, MgO+CaO+SrO+BaO is from 15 to 20%, and SrO+BaO is from 4 to 10%.

Furthermore, the present invention provides a non-alkali glass substrate 2, having a strain point of 685° C. or higher and 750° C. or lower, an average thermal expansion coefficient at 50 to 350° C. of from $35 \times 10^{-7}$ to $43 \times 10^{-7}$/° C., a specific gravity of from 2.50 to 2.80, a photoelastic constant of 25 nm/MPa/cm or more and less than 29 nm/MPa/cm, and a temperature ($T_4$) at which viscosity reaches $10^4$ dPa·s of 1,250° C. or higher and 1,335° C. or lower, and containing, indicated by mol % on the basis of oxides,
  63% or more and 67% or less of $SiO_2$,
  12.2% or more and 14% or less of $Al_2O_3$,
  3% or more and less than 4.3% of $B_2O_3$,
  7% or more and 13% or less of MgO,
  0% or more and 9% or less of CaO, 0% or more and 3% or less of SrO, and
0% or more and 7% or less of BaO,
in which, MgO+CaO+SrO+BaO is from 15 to 20%,
CaO is from $(6 \times B_2O_3 - 21)$% to $(6 \times B_2O_3 - 14)$%, and
SrO+BaO is from $(-6 \times B_2O_3 + 19)$% to $(-6 \times B_2O_3 + 28)$%.

Advantageous Effects of the Invention

The non-alkali glass substrate of the present invention has a high strain point, a low specific gravity, a low photoelastic constant, and a high Young's modulus, and hardly causes problems such as color unevenness even when stress is applied thereto. Therefore, it is suitable as a non-alkali glass substrate used in a field of potable displays such as small- or medium-sized LCD and OLED, particularly a mobile, a digital camera and a mobile phone. Further, it can also be used as a non-alkali glass substrate for a magnetic disk.

MODE FOR CARRYING OUT THE INVENTION

In the present invention, the present inventors found that it is only necessary to adjust the contents of respective components to specific values depending on the content of $B_2O_3$, more specifically that it is necessary to change the content ratio of alkali earth metal oxides between the case where the content of $B_2O_3$ is 0.5% or more and less than 3% and the case of 3% or more and less than 4.3% (indicated by mol % on the basis of oxides), in order to obtain a non-alkali glass having a small photoelastic constant while fulfilling a high strain point, a low average thermal expansion coefficient and a low viscosity.

The non-alkali glass substrate of the present invention will be described.
1. Composition of Non-Alkali Glass Substrate
(Non-Alkali Glass Substrate 1 (the Content of $B_2O_3$ is 0.5% or More and Less than 3%)
Next, the composition range of respective components in the case of the above-mentioned non-alkali glass substrate 1 will be described.

In order to reduce photoelastic constant, the smaller content of $SiO_2$ is preferable. However, in the case of less than 63 mol % (hereinafter, simply referred to as %), there is a tendency that strain point may be not sufficiently increased, average thermal expansion coefficient may be increased, and specific gravity may be increased. It is preferably 64% or more, and more preferably 65% or more. In the case of exceeding 68%, there is a tendency that meltability of the glass may be decreased, Young's modulus may be decreased, devitrification temperature may be increased, and photoelastic constant may be increased. It is preferably 67% or less, and more preferably 66% or less.

$Al_2O_3$ increases Young's modulus to suppress deflection, suppresses phase separation of the glass, decreases thermal expansion coefficient, increases strain point, and improves fracture toughness value to increase glass strength. However, in the case of less than 12.2%, these effects are hardly exhibited, and since another component for increasing average thermal expansion coefficient is required to be relatively increased, average thermal expansion coefficient tends to be increased. It is preferably 12.5% or more, and more preferably 13% or more. In the case of exceeding 14%, there is a tendency that meltability of the glass may become degraded, and in addition, devitrification temperature may be increased. It is preferably 13.8% or less, and more preferably 13.5% or less.

$B_2O_3$ improves melting reactivity of the glass and decreases devitrification temperature. In consideration of the balance among strain point, devitrification characteristics, a low viscosity, and a high strain point, it is 0.5% or more, preferably 1% or more, more preferably 1.5% or more, still more preferably 2% or more, and particularly more preferably 2.5% or more. In view of the easiness of reducing photoelasticity and increasing strain point, it is adjusted to less than 3%. It is preferably 2.5% or less, and more preferably 2.0% or less.

Since MgO increases Young's modulus without increasing specific gravity, deflection can be reduced by increasing specific modulus, so that the fracture toughness value is improved to increase glass strength. In addition, among alkali earth metal oxides, MgO does not excessively increase average thermal expansion coefficient and also improves meltability. However, in the case of less than 6.5%, these effects are hardly exhibited. It is preferably 7% or more, more preferably 7.5% or more, still more preferably 8% or more, particularly preferably 8.5% or more, more particularly preferably 9% or more, most preferably 9.5% or more, and more most preferably 10% or more. In the case of exceeding 13%, devitrification temperature may be increased, and devitrification tends to become a problem at the time of producing the glass. It is preferably 12.5% or less, more preferably 12% or less, still more preferably 11.5% or less, and particularly preferably 11% or less.

CaO has characteristics that it can increase specific modulus, next to MgO, among alkali earth metal oxides, does not excessively increase average thermal expansion coefficient, and does not excessively decrease strain point. It also improves meltability similarly to MgO, and hardly increases devitrification temperature compared to the case of MgO, so that the devitrification is unlikely to become a problem at the time of producing the glass. In the case of exceeding 4%, there is a tendency that average thermal expansion coefficient may be increased, and devitrification temperature may be increased, so that the devitrification tends to become a problem at the time of producing the glass, and the effect of decreasing photoelastic constant is weakened in the composition of the non-alkali glass substrate 1. It is preferably 3.5% or less, more preferably 3% or less, still more preferably 2.5% or less, further still more preferably 2% or less, particularly preferably 1.5% or less, more particularly preferably 1% or less, most preferably 0.5% or less, and more most preferably not substantially contained.

Incidentally, the expression "not substantially contained" in the present invention means that materials other than unavoidable impurities mixed from raw materials or the like are not contained, that is, not contained intentionally.

SrO has characteristics that it improves meltability without increasing devitrification temperature of the glass and decreases photoelastic constant. However, the effect thereof is smaller than that of BaO, and the effect of increasing specific gravity is more apparent. Accordingly, it is preferable that SrO be not largely contained. It is therefore adjusted to 9% or less. In view of easiness of increasing specific gravity and easiness of increasing average thermal expansion coefficient, it is preferably 8% or less, more preferably 7% or less, still more preferably 6% or less, and particularly preferably 5% or less.

BaO has characteristics that it improves meltability of the glass without increasing devitrification temperature and decreases photoelastic constant. However, when BaO is largely contained, there is a tendency that specific gravity may be increased and average thermal expansion coefficient may be increased.

It is preferably 1% or more, more preferably 2% or more, and still more preferably 3% or more. In the case of exceeding 10%, specific gravity may be increased and average thermal expansion coefficient may be increased. It is preferably 9.5% or less, more preferably 9% or less, still more preferably 8.5% or less, and particularly preferably 8% or less.

SrO+BaO has a characteristic that it decreases photoelastic constant, so that it is allowed to be contained in an amount of 4% or more in the total content. The content thereof is preferably 5% or more, more preferably 6% or more, and still more preferably 7% or more. In order to avoid increasing specific gravity, increasing average thermal expansion coefficient, decreasing strain point and increasing $T_2$ or $T_4$, SrO+BaO is adjusted to 10% or less. It is preferably 9% or less. More preferably, it is adjusted to 8% or less.

When the content of $B_2O_3$ is 0.5% or more and less than 3%, it is effective to decrease photoelastic constant by increasing SrO+BaO as much as possible because there is room for strain point. However, when SrO+BaO is increased, $T_2$ or $T_4$ is increased. It is therefore necessary to improve meltability and to leave MgO largely contained. Accordingly, the present inventors have found that the content of CaO is extremely decreased.

When MgO, CaO, SrO and BaO are less than 15% in the total content, there is a tendency that photoelastic constant may be increased and meltability may be decreased. MgO, CaO, SrO and BaO is preferably largely contained for the purpose of decreasing photoelastic constant and therefore the total content thereof is more preferably 16% or more, and still more preferably 16.5% or more. In the case of more than 20%, there is a tendency that average thermal expansion coefficient cannot be decreased, and strain point may be decreased. It is preferably 19.5% or less, and more preferably 19.0% or less.

Alkali metal oxides such as $Na_2O$ and $K_2O$ are not substantially contained. For example, the content thereof is 0.1% or less.

$ZrO_2$ may be contained up to 2% in order to increase Young's modulus and decrease glass melting temperature or accelerate crystal deposition at the time of firing. In the case of exceeding 2%, there is a tendency that the glass may become unstable or relative dielectric constant ∈ of the glass may be increased. It is preferably 1.5% or less, more preferably 1.0% or less, still more preferably 0.5% or less, and particularly preferably not substantially contained.

Incidentally, at the time of producing a display using a glass plate made of the non-alkali glass substrate 1 of the present invention, in order not to cause the characteristic deteriorations of a thin film of a metal, an oxide or the like provided on the surface of the glass plate, it is preferable that the glass do not substantially contain $P_2O_5$. Further, in order to facilitate recycle of the glass, it is preferable that the glass do not substantially contain PbO, $As_2O_3$ and $Sb_2O_3$.

In order to improve meltability, clarity and formability of the glass, the non-alkali glass substrate 1 may contain ZnO, $Fe_2O_3$, $SO_3$, F, Cl and $SnO_2$ in an amount of 5% or less in the total content. They can be contained in the glass preferably in an amount of 1% or less, preferably 0.5% or less, more preferably 0.3% or less, still more preferably 0.15% or less, and particularly preferably 0.1% or less in the total content. It is preferable that ZnO be not substantially contained.

(Non-Alkali Glass Substrate 2 (the Content of $B_2O_3$ is 3% or More and Less than 4.3%)

Next, the composition range of respective components in the case of the above-mentioned non-alkali glass substrate 2 will be described.

In order to reduce photoelastic constant, the smaller content of $SiO_2$ is preferable. However, in the case of less than 63 mol % (hereinafter, simply referred to as %), there is a tendency that strain point may be not sufficiently increased, average thermal expansion coefficient may be increased, and specific gravity may be increased. It is preferably 64% or more. In the case of exceeding 67%, there is a tendency that meltability of the glass may be decreased, Young's modulus may be decreased, devitrification temperature may be increased, and photoelastic constant may be increased. It is preferably 66% or less.

$Al_2O_3$ increases Young's modulus to suppress deflection, suppresses phase separation of the glass, decreases thermal expansion coefficient, increases strain point, and improves fracture toughness value to increase glass strength. However, in the case of less than 12.2%, these effects are hardly exhibited, and since another component for increasing average thermal expansion coefficient is required to be relatively increased, average thermal expansion coefficient tends to be increased. It is preferably 12.5% or more, and more preferably 13% or more. In the case of exceeding 14%, there is a tendency that meltability of the glass may become degraded, and in addition, devitrification temperature may be increased. It is preferably 13.5% or less.

$B_2O_3$ improves melting reactivity of the glass and decreases devitrification temperature. However, in the composition of the non-alkali glass substrate 2, in the case of exceeding 4.3%, strain point may be decreased, and problems such as color unevenness are liable to occur when stress is applied thereto. It is therefore adjusted to less than 4.3%. In view of decreasing weight, decreasing devitrification temperature and decreasing viscosity, it is adjusted to 3% or more, and preferably to 3.5% or more. Further, in view of decreasing photoelasticity and increasing strain point, it is preferably 4% or less and more preferably 3.7% or less.

Since MgO increases Young's modulus without increasing specific gravity, deflection can be reduced by increasing specific modulus, so that the fracture toughness value is improved to increase glass strength. In addition, among alkali earth metal oxides, MgO does not excessively increase average thermal expansion coefficient and also improves meltability. However, in the case of less than 7% in the composition of the non-alkali glass substrate 2, these effects are hardly exhibited and devitrification temperature is liable to become a problem. It is preferably 7.5% or more, more preferably 8% or more, and still more preferably 8.5% or more. In the case of exceeding 13%, devitrification temperature may be increased, and devitrification tends to become a problem at the time of producing the glass. It is preferably 12.5% or less and more preferably 12% or less.

CaO has characteristics that it can increase specific modulus, next to MgO, among alkali earth metal oxides, does not excessively increase average thermal expansion coefficient, and does not excessively decrease strain point. It also improves meltability similarly to MgO, and hardly increases devitrification temperature compared to the case of MgO, so that devitrification is unlikely to become a problem at the time of producing the glass. In the composition of the non-alkali glass substrate 2, in view of a high strain point, a low average thermal expansion coefficient and a low viscosity, it is preferably 1% or more, more preferably 2% or more, and still more preferably 3% or more. In the case of exceeding 9%, average thermal expansion coefficient is increased, and devitrification temperature is increased, so that devitrification tends to become a problem at the time of producing the glass. It is preferably 8% or less, and more preferably 7.5% or less.

In the case where the content of $B_2O_3$ is 3% or more and less than 4.3%, it is necessary to ensure the strain point by gradually decreasing SrO+BaO that decreases strain point among alkali earth metal oxides, because there is no room for strain point. In consideration of maintaining the low viscosity and the low devitrification temperature, it is necessary to divide the amount corresponding to SrO+BaO reduced to MgO and CaO. In this case, in order to decrease photoelastic constant, it is effective to divide it to CaO rather than to MgO. At this time, it is necessary to keep $T_2$ and $T_4$ low, so that it is necessary that MgO is allowed to be contained as much as the devitrification temperature permits. Accordingly, the amount of SrO+BaO is decreased as the content of $B_2O_3$ is increased, resulting in an increase in the content of CaO.

That is, in order to reduce photoelastic constant while fulfilling a high strain point, a low average thermal expansion coefficient and a low viscosity, the content of CaO is adjusted to $(6 \times B_2O_3-21)$% or more and $(6 \times B_2O_3-14)$% or less.

In view of a high strain point and a low average thermal expansion coefficient, the content of CaO is preferably $(6 \times B_2O_3-15)$% or less, more preferably $(6 \times B_2O_3-16)$% or less, and still more preferably $(6 \times B_2O_3-17)$% or less. The content of CaO is 0 or more.

In view of a low photoelastic constant and a low viscosity, the content of CaO is preferably $(6 \times B_2O_3-20)$% or more, more preferably $(6 \times B_2O_3-19)$% or more, and still more preferably $(6 \times B_2O_3-18)$% or more.

SrO has characteristics that it improves meltability without increasing devitrification temperature of the glass and decreases photoelastic constant. However, the effect thereof is smaller than that of BaO, and the effect of increasing specific gravity is more apparent. Accordingly, it is preferable that SrO be not largely contained. It is therefore adjusted to 3% or less. In view of low specific gravity and low average thermal expansion coefficient, it is preferably 2.5% or less and more preferably 2% or less.

BaO has characteristics that it improves meltability of the glass without increasing devitrification temperature and decreases photoelastic constant. However, when BaO is largely contained, there is a tendency that specific gravity may be increased and average thermal expansion coefficient may be increased. In the case of exceeding 7%, specific gravity may be increased and average thermal expansion coefficient may be increased. It is preferably 6% or less, more preferably 5% or less, still more preferably 4% or less, and particularly preferably 3% or less. It is 0% or more, preferably 0.5% or more, more preferably 1% or more, and still more preferably 1.5% or more.

In order to decrease photoelastic constant while fulfilling a high strain point, a low average thermal expansion coefficient and a low viscosity, the total content of SrO and BaO is adjusted to $(-6 \times B_2O_3+19)$% or more and $(-6 \times B_2O_3+28)$% or less.

In view of that photoelasticity should be decreased as much as possible, the total content of SrO and BaO is adjusted to $(-6 \times B_2O_3+19)$% or more. It is preferably $(-6 \times B_2O_3+20)$% or more.

In view of that a high strain point, a low expansion coefficient and a low viscosity should be maintained, it is adjusted to $(-6 \times B_2O_3+28)$% or less. It is preferably $(-6 \times B_2O_3+27)$% or less, and more preferably $(-6 \times B_2O_3+26)$% or less. Incidentally, the total content of SrO and BaO is 0 or more.

When MgO, CaO, SrO and BaO are less than 15% in the total content, there is a tendency that photoelastic constant may be increased and meltability may be decreased. The total content thereof is more preferably 16% or more, and still more preferably 17% or more. In the case of more than 20%, there may arise a problem that average thermal expansion coefficient cannot be decreased. It is preferably 19.5% or less and more preferably 19.0% or less.

In the non-alkali glass substrate 2, similar to the non-alkali glass substrate 1, alkali metal oxides such as $Na_2O$ and $K_2O$ are not substantially contained. For example, the content thereof is 0.1% or less.

$ZrO_2$ may be contained up to 2% in order to increase Young's modulus and decrease glass melting temperature or accelerate crystal deposition at the time of firing. In the case of exceeding 2%, there is a tendency that the glass may become unstable or relative dielectric constant $\in$ of the glass may be increased. It is preferably 1.5% or less, more preferably 1.0% or less, still more preferably 0.5% or less, and particularly preferably not substantially contained.

Regarding other components such as $P_2O_5$, PbO, $As_2O_3$ and $Sb_2O_3$, similar to the non-alkali glass substrate 1, it is preferable that the glass do not substantially contain them.

In order to improve meltability, clarity and formability of the glass, the non-alkali glass substrate 2 may contain ZnO, $Fe_2O_3$, $SO_3$, F, Cl and $SnO_2$ in an amount of 5% or less in the total content. They can be contained in the glass preferably in an amount of 1% or less and preferably 0.5% or less in the total content. It is preferable that ZnO be not substantially contained, 2. Production of Non-Alkali Glass Substrates Production of the non-alkali glass substrate of the present invention is, for example, performed by the following procedures.

Raw materials of respective components are blended to make target components (the above-described non-alkali glass substrate 1 and 2), continuously put into a melting furnace and heated at from 1,500 to 1,800° C. to be melted, thereby obtaining molten glass. A non-alkali glass substrate can be obtained by forming the molten glass into a glass ribbon having a predetermined plate thickness in a forming apparatus, annealing the glass ribbon, and then cutting the glass ribbon.

In the present invention, the glass substrate is preferably formed by a float method, an overflow down-draw method or the like, particularly by an overflow down-draw method. Incidentally, in consideration of stably forming the large-sized glass substrate (e.g., 2 m or more on a side), a float method is preferable.

The plate thickness of the glass of the present invention is preferably 0.7 mm or less, more preferably 0.5 mm or less, still more preferably 0.3 mm or less, and particularly preferably 0.1 mm or less.

3. Physical Properties of Non-Alkali Glass Substrates (Non-Alkali Glass Substrate 1)

The non-alkali glass substrate 1 of the present invention has a strain point of 685° C. or higher, preferably 690° C. or higher, and more preferably higher than 700° C. and 750° C. or lower. Thereby, thermal shrinkage at the time of producing a display using the non-alkali glass substrate 1 can be suppressed. It is more preferably 705° C. or higher, still more preferably 710° C. or higher, particularly preferably 715° C. or higher, and most preferably 720° C. or higher. When the strain point is 685° C. or higher, preferably 690°

C. or higher, and more preferably higher than 700° C., the glass is suitable for a high strain point use (e.g., a display substrate or an illumination substrate for an OLED, or a display substrate or an illumination substrate of a thin plate having a plate thickness of 100 μm or less).

However, when the strain point of the non-alkali glass substrate is too high, it is necessary to increase the temperature of a forming apparatus accordingly, which tends to shorten the lifetime of the forming apparatus. For this reason, the non-alkali glass substrate 1 of the present invention has a strain point of 750° C. or lower, preferably 745° C. or lower, more preferably 740° C. or lower, still more preferably 735° C. or lower, particularly preferably 730° C. or lower, most preferably 725° C. or lower.

Further, for the same reason as the case of the strain point, the non-alkali glass substrate 1 of the present invention has a glass transition point of preferably 750° C. or higher, more preferably 755° C. or higher, still more preferably 760° C. or higher, particularly preferably 765° C. or higher, more particularly preferably 770° C. or higher, and most preferably 775° C. or higher. In view of prevention of degradation of the production equipment against high temperature, trouble avoidance and cost reduction, the glass transition point is preferably 810° C. or lower, more preferably 795° C. or lower, still more preferably 790° C. or lower, particularly preferably 785° C. or lower, and most preferably 780° C. or lower.

Furthermore, the non-alkali glass substrate 1 of the present invention has an average thermal expansion coefficient at from 50 to 350° C. of from $35 \times 10^{-7}$ to $43 \times 10^{-7}$/° C. Thereby, thermal shock resistance is increased, and productivity at the time of producing a display using the non-alkali glass substrate 1 can be increased. In the non-alkali glass substrate 1 of the present invention, it is preferably $36 \times 10^{-7}$/° C. or more, and more preferably $37 \times 10^{-7}$/° C. or more. In view of thermal shock resistance, it is preferably $40 \times 10^{-7}$/° C. or less, and more preferably $39 \times 10^{-7}$/° C.

In addition, the non-alkali glass substrate 1 of the present invention has a specific gravity of 2.80 or less, preferably 2.75 or less. In view of ensuring a low photoelastic constant, the specific gravity is 2.50 or more, preferably 2.55 or more, more preferably 2.60 or more, still more preferably 2.65 or more, and particularly preferably 2.70 or more.

Further, the non-alkali glass substrate 1 of the present invention has a specific modulus of preferably 29 MNm/kg or more. In the case of less than 29 MNm/kg, problems such as a trouble in conveyance and a crack due to self-weight deflection easily occur. It is more preferably 30 MNm/kg or more, still more preferably 30.5 MNm/kg or more, and particularly preferably 31 MNm/kg or more.

Furthermore, the non-alkali glass substrate 1 of the present invention has a Young's modulus of preferably 76 GPa or more, more preferably 77 GPa or more, still more preferably 78 GPa or more, and particularly preferably 79 GPa or more. In order to fulfill various physical properties, the Young's modulus is preferably 90 GPa or less, more preferably 89 GPa or less, still more preferably 88 GPa or less, and particularly preferably 87 GPa or less.

In addition, the non-alkali glass substrate 1 of the present invention has a photoelastic constant of less than 29 nm/MPa/cm.

When the glass plate used for a display has birefringence due to stress generated in an LCD production step or at the time of using the LCD apparatus, a phenomenon is sometimes recognized that display of black turns to grey to decrease a contrast of the liquid crystal display. This phenomenon can be suppressed small by adjusting the photoelastic constant to less than 29 nm/MPa/cm. It is more preferably 28.5 nm/MPa/cm or less, still more preferably 28 nm/MPa/cm or less, particularly preferably 27.5 nm/MPa/cm or less, and most preferably 27 nm/MPa/cm or less.

In consideration of the easiness of securing other physical properties, the photoelastic constant is 25 nm/MPa/cm or more, preferably 25.5 nm/MPa/cm or more, more preferably 26 nm/MPa/cm or more, and still more preferably 26.5 nm/MPa/cm or more. Incidentally, the photoelastic constant can be measured at a measurement wavelength of 546 nm by means of a disk compression method.

Further, the non-alkali glass substrate 1 of the present invention has a temperature $T_2$ at which viscosity η reaches $10^2$ poise (dPa·s) of preferably lower than 1,710° C., more preferably 1,700° C. or lower, still more preferably 1,690° C. or lower, particularly preferably 1,680° C. or lower, and most preferably 1,670° C. or lower. Thereby, melting becomes relatively easy. In view of securing a low average thermal expansion coefficient and a high strain point, $T_2$ is preferably 1,600° C. or higher, more preferably 1,620° C. or higher, still more preferably 1,630° C. or higher, particularly preferably 1,640° C. or higher, more particularly preferably 1,650° C. or higher, and most preferably 1,660° C. or higher.

Furthermore, the non-alkali glass substrate 1 of the present invention has a temperature $T_4$ at which viscosity η reaches $10^4$ poise of lower than 1,350° C., preferably 1,340° C. or lower, more preferably 1,330° C. or lower, still more preferably 1,320° C. or lower, and particularly preferably 1,310° C. or lower. In view of securing a low average thermal expansion coefficient and a high strain point, $T_4$ is 1,250° C. or higher, preferably 1,260° C. or higher, more preferably 1,270° C. or higher, still more preferably 1,280° C. or higher, particularly preferably 1,290° C. or higher, and most preferably 1,300° C. or higher.

The non-alkali glass substrate 1 of the present invention has a devitrification temperature of preferably 1,200° C. or higher and lower than 1,370° C. In order to fulfill various physical properties, the devitrification temperature is more preferably 1,220° C. or higher, still more preferably 1,240° C. or higher, particularly preferably 1,260° C. or higher, and most preferably 1,280° C. or higher. In addition, in view of prevention of degradation of production equipment against high temperature, trouble avoidance and cost reduction, it is more preferably 1,350° C. or lower, still more preferably 1,330° C. or lower, particularly preferably 1,310° C. or lower, and most preferably 1,290° C. or lower.

The devitrification temperature in the present invention is an average value between the maximum temperature at which crystals are deposited on a surface and inside of a glass and the minimum temperature at which crystals are not deposited, which are determined by putting pulverized glass particles in a platinum plate, performing heat treatment for 17 hours in an electric furnace controlled to a constant temperature, and performing optical microscopic observation after the heat treatment.

Incidentally, it is preferable that the non-alkali glass substrate 1 of the present invention has a small shrinkage amount at the time of heat treatment. In the production of a liquid crystal panel, the array side is different in heat treatment process from the color filter side. For this reason, particularly in a high-definition panel, when the thermal shrinkage percentage of the glass is large, there is a problem that dot deviation occurs at the time of fitting. Incidentally, evaluation of the thermal shrinkage percentage can be performed by the following procedure. A sample is held at a temperature of a glass transition temperature+100° C. for 10 minutes, and thereafter cooled to room temperature at 40°

C. per minute. The total length (taken as L0) of the sample is measured at this time. Then, the sample is heated to 600° C. at 100° C. per hour, held at 600° C. for 80 minutes, and cooled to room temperature at 100° C. per hour. The total length of the sample is measured again, and the shrinkage amount (taken as ΔL) of the sample before and after the heat treatment at 600° C. is measured. The ratio of the shrinkage amount to the total length of the sample before the heat treatment (ΔL/L0) is defined as the thermal shrinkage percentage. In the above-mentioned evaluation method, the thermal shrinkage percentage is preferably 100 ppm or less, more preferably 80 ppm or less, still more preferably 60 ppm or less, further preferably 55 ppm or less, and particularly preferably 50 ppm or less.

(Non-Alkali Glass Substrate 2)

The non-alkali glass substrate 2 of the present invention has a strain point of 685° C. or higher, preferably 690° C. or higher, and more preferably higher than 700° C. and 750° C. or lower. Thereby, thermal shrinkage at the time of producing a display using the non-alkali glass substrate 2 can be suppressed. It is more preferably 705° C. or higher. When the strain point is 685° C. or higher, preferably 690° C. or higher, and more preferably higher than 700° C., the glass is suitable for a high strain point use (e.g., a display substrate or an illumination substrate for an OLED, or a display substrate or an illumination substrate of a thin plate having a plate thickness of 100 μm or less).

However, when the strain point of the non-alkali glass substrate is too high, it is necessary to increase the temperature of a forming apparatus accordingly, which tends to shorten the lifetime of the forming apparatus. For this reason, the non-alkali glass substrate 2 of the present invention has a strain point of 730° C. or lower, and preferably 720° C. or lower.

Further, for the same reason as the case of the strain point, the non-alkali glass substrate 2 of the present invention has a glass transition point of preferably 740° C. or higher, more preferably 750° C. or higher, and still more preferably 760° C. or higher. In view of prevention of degradation of production equipment against high temperature, trouble avoidance and cost reduction, the glass transition point is preferably 790° C. or lower, and more preferably 780° C. or lower.

Furthermore, the non-alkali glass substrate 2 of the present invention has an average thermal expansion coefficient at from 50 to 350° C. of from $35 \times 10^{-7}$ to $43 \times 10^{-7}$/° C. Thereby, thermal shock resistance is increased, and productivity at the time of producing a display using the non-alkali glass substrate 2 can be increased. In the non-alkali glass substrate 2 of the present invention, it is preferably $36 \times 10^{-7}$/° C. or more. In view of thermal shock resistance, it is preferably $40 \times 10^{-7}$/° C. or less, and more preferably $39 \times 10^{-7}$/° C. or less.

In addition, the non-alkali glass substrate 2 of the present invention has a specific gravity of 2.80 or less, preferably 2.65 or less, and more preferably 2.60 or less. In view of ensuring a low photoelastic constant, the specific gravity is 2.50 or more.

Further, the non-alkali glass substrate 2 of the present invention has a specific modulus of preferably 29 MNm/kg or more. In the case of less than 29 MNm/kg, problems such as a trouble in conveyance and a crack due to self-weight deflection easily occur. It is more preferably 30 MNm/kg or more, still more preferably 30.5 MNm/kg or more, and particularly preferably 31 MNm/kg or more.

Furthermore, the non-alkali glass substrate 2 of the present invention has a Young's modulus of preferably 76 GPa or more, more preferably 78 GPa or more, still more preferably 80 GPa or more, and particularly preferably 82 GPa or more. In order to fulfill various physical properties, the Young's modulus is preferably 88 GPa or less, more preferably 87 GPa or less, still more preferably 86 GPa or less, and particularly preferably 85 GPa or less.

In addition, the non-alkali glass substrate 2 of the present invention has a photoelastic constant of less than 29 nm/MPa/cm.

When the glass plate used for a display has birefringence due to stress generated in an LCD production step or at the time of using the LCD apparatus, a phenomenon is sometimes recognized that display of black turns to grey to decrease a contrast of the liquid crystal display. This phenomenon can be suppressed small by adjusting the photoelastic constant to less than 29 nm/MPa/cm. It is more preferably 28.5 nm/MPa/cm or less, and still more preferably 28 nm/MPa/cm or less.

In consideration of the easiness of securing other physical properties, the photoelastic constant is 25 nm/MPa/cm or more, preferably 26 nm/MPa/cm or more, and more preferably 26.5 nm/MPa/cm or more.

Incidentally, the photoelastic constant can be measured at a measurement wavelength of 546 nm by means of a disk compression method.

Further, the non-alkali glass substrate 2 of the present invention has a temperature $T_2$ at which viscosity η reaches $10^2$ poise (dPa·s) of preferably 1,730° C. or lower, more preferably 1,710° C. or lower, still more preferably 1,690° C. or lower, particularly preferably 1,670° C. or lower, and most preferably 1,650° C. or lower. Thereby, melting becomes relatively easy. In view of securing a low average thermal expansion coefficient and a high strain point, $T_2$ is preferably 1,600° C. or higher, and more preferably 1,610° C. or higher.

Furthermore, the non-alkali glass substrate 2 of the present invention has a temperature $T_4$ at which viscosity η reaches $10^4$ poise of 1,335° C. or lower, preferably 1,330° C. or lower, more preferably 1,310° C. or lower, and still more preferably 1,290° C. or lower. In view of securing a low average thermal expansion coefficient and a high strain point, $T_4$ is 1,250° C. or higher, and preferably 1,260° C. or higher.

In addition, the non-alkali glass substrate 2 of the present invention has a devitrification temperature of preferably 1,200° C. or higher and 1,350° C. or lower. In order to fulfill various physical properties, the devitrification temperature is more preferably 1,220° C. or higher. Further, similarly, in view of prevention of degradation of production equipment against high temperature, trouble avoidance and cost reduction, it is more preferably 1,330° C. or lower, still more preferably 1,310° C. or lower, and particularly preferably 1,290° C. or lower.

The devitrification temperature in the present invention is an average value between the maximum temperature at which crystals are deposited on a surface and inside of a glass and the minimum temperature at which crystals are not deposited, which are determined by putting pulverized glass particles in a platinum plate, performing heat treatment for 17 hours in an electric furnace controlled to a constant temperature, and performing optical microscopic observation after the heat treatment.

Incidentally, it is preferable that the non-alkali glass substrate 2 of the present invention has a small shrinkage amount at the time of heat treatment. In the production of a liquid crystal panel, the array side is different in heat treatment process from the color filter side. For this reason, particularly in a high-definition panel, when the thermal shrinkage percentage of the glass is large, there is a problem that dot deviation occurs at the time of fitting. Incidentally, evaluation of the thermal shrinkage percentage can be performed by the following procedure. A sample is held at a temperature of a glass transition temperature+100° C. for 10 minutes, and thereafter cooled to room temperature at 40° C. per minute. The total length (taken as L0) of the sample is measured at this time. Then, the sample is heated to 600° C. at 100° C. per hour, held at 600° C. for 80 minutes, and cooled to room temperature at 100° C. per hour. The total length of the sample is measured again, and the shrinkage amount (taken as ΔL) of the sample before and after the heat treatment at 600° C. is measured. The ratio of the shrinkage amount to the total length of the sample before the heat treatment (ΔL/L0) is defined as the thermal shrinkage percentage. In the above-mentioned evaluation method, the thermal shrinkage percentage is preferably 100 ppm or less, more preferably 80 ppm or less, still more preferably 60 ppm or less, further preferably 55 ppm or less, and particularly preferably 50 ppm or less.

EXAMPLES

Inventive Examples

Examples 1 to 8, 19 and 20 (Non-Alkali Glass Substrate 1), Examples 9 to 12 and 21 to 27 (Non-Alkali Glass Substrate 2), Comparative Examples: Examples 13 to 18)

The present invention will be described below in more detail with reference to Examples and Production Examples, but the present invention is not limited to these Examples and Production Examples.

Raw materials of respective components were blended to the target compositions shown in Tables 1 and 2, and melted by using a platinum crucible at a temperature of 1,600° C. for 1 hour. After melting, each composition was allowed to flow out on a carbon plate, held at a temperature of the glass transition point+30° C. for 1 hour, and then cooled at 1° C./min to perform annealing. The glass obtained was mirror-polished to obtain a glass plate, which are subjected to the following various evaluations.

For the glass substrates of the respective examples thus obtained, the average thermal expansion coefficient (unit: ×10$^{-7}$/° C.) at from 50 to 350° C., the strain point, the glass transition point (Tg) (unit: ° C.), the specific gravity, the Young's modulus, $T_2$, $T_4$, the devitrification temperature, the photoelastic constant (measurement wavelength: 546 nm) and the thermal shrinkage amount are shown in Tables 1 and 2. In the tables, the physical property values in parenthesis are calculated values.

TABLE 1

|  | Ex. 1 | Ex. 2 | Ex. 3 | Ex. 4 | Ex. 5 | Ex. 6 | Ex. 7 | Ex. 8 | Ex. 13 | Ex. 14 | Ex. 19 | Ex. 20 |
|---|---|---|---|---|---|---|---|---|---|---|---|---|
| $SiO_2$ | 67.7 | 68.0 | 67.9 | 67.8 | 65.8 | 66.8 | 66.8 | 66.9 | 66.1 | 67.3 | 65.4 | 66.7 |
| $Al_2O_3$ | 12.2 | 12.2 | 13.5 | 13.5 | 13.5 | 12.5 | 12.5 | 12.5 | 13.6 | 13.0 | 13.8 | 13.0 |
| $B_2O_3$ | 1.5 | 1.7 | 1.8 | 2.3 | 2.8 | 2.9 | 2.9 | 2.9 | 2.9 | 2.3 | 1.2 | 0.8 |
| MgO | 10.8 | 11.0 | 7.0 | 8.0 | 10.5 | 10.0 | 10.0 | 10.0 | 8.0 | 10.7 | 8.8 | 12.0 |
| CaO | 0 | 0 | 2.0 | 0 | 0 | 1.3 | 1.3 | 1.3 | 6.2 | 3.7 | 3.0 | 2.5 |
| SrO | 7.8 | 0 | 5.8 | 0 | 0 | 0 | 6.5 | 3.2 | 0.6 | 0 | 4.2 | 0 |
| BaO | 0 | 7.1 | 2.0 | 8.4 | 7.4 | 6.5 | 0 | 3.2 | 2.6 | 3.0 | 3.6 | 5.0 |
| MgO + CaO + SrO + BaO | 18.6 | 18.1 | 16.8 | 16.4 | 17.9 | 17.7 | 17.7 | 17.7 | 17.5 | 17.4 | 19.6 | 19.5 |
| SrO + BaO | 7.8 | 7.1 | 7.8 | 8.4 | 7.4 | 6.5 | 6.5 | 6.5 | 3.2 | 3.0 | 7.8 | 5.0 |
| Average thermal expansion coefficient [×10$^{-7}$/° C.] | 37.7 | 39.7 | 39.7 | 40.7 | 39.4 | 39.0 | 38.0 | 38.8 | (39.0) | (36.0) | 42.3 | 41.1 |
| Strain point [° C.] | (723) | (725) | 712 | (731) | (720) | (716) | 686 | (717) | (725) | (720) | 722 | 724 |
| Tg [° C.] | 778 | 780 | 793 | 786 | 775 | 771 | 771 | 772 | (780) | (775) | 779 | 779 |
| Specific gravity | 2.63 | 2.70 | 2.61 | 2.72 | 2.71 | 2.67 | 2.58 | 2.63 | (2.59) | (2.57) | 2.70 | 2.68 |
| Young's modulus [GPa] | 82.8 | 83.0 | 82.4 | 78.9 | 83.0 | 79.2 | 81.5 | 80.1 | (85) | (84) | 86 | 87 |
| $T_2$ [° C.] | 1668 | 1705 | 1702 | 1705 | 1666 | 1698 | 1675 | 1695 | (1650) | (1670) | 1645 | 1648 |
| $T_4$ [° C.] | 1304 | 1331 | 1333 | 1338 | 1305 | 1324 | 1306 | 1320 | (1290) | (1290) | 1302 | 1303 |
| Devitrification temperature [° C.] | 1313 | 1262 | 1312 | 1262 | 1287 | 1287 | 1287 | 1262 |  |  | 1285 | 1305 |
| Photoelastic constant [nm/MPa/cm] | 26.7 | 26.5 | 27.2 | 26.9 | 26.6 | 27.9 | 28.4 | 28.3 | 29.0 | 29.1 | 26.1 | 26.1 |
| Thermal shrinkage amount [ppm] |  | 41.4 |  |  |  | 54.1 |  |  |  |  | 32.7 | 28.9 |

|  | Ex. 9 | Ex. 10 | Ex. 11 | Ex. 12 | Ex. 15 | Ex. 16 | Ex. 17 | Ex. 18 |
|---|---|---|---|---|---|---|---|---|
| $SiO_2$ | 65.7 | 66.9 | 66.5 | 64.7 | 68.5 | 67.9 | 66.7 | 66.7 |
| $Al_2O_3$ | 12.5 | 12.5 | 13.0 | 13.5 | 12.1 | 12.5 | 13.5 | 13.0 |
| $B_2O_3$ | 3.0 | 3.2 | 3.3 | 3.6 | 3.0 | 4.0 | 3.6 | 3.3 |
| MgO | 12.0 | 8.9 | 9.0 | 8.7 | 6.5 | 9.0 | 3.7 | 7.0 |
| CaO | 3.8 | 2.7 | 1.8 | 7.5 | 3.3 | 3.7 | 10.5 | 0.0 |
| SrO | 0 | 0 | 0 | 2.0 | 3.3 | 0 | 2.0 | 3.0 |
| BaO | 3.0 | 5.8 | 6.4 | 0 | 3.3 | 2.9 | 0 | 7.0 |
| MgO + CaO + SrO + BaO | 18.8 | 17.4 | 17.3 | 18.2 | 16.4 | 15.7 | 16.2 | 17.0 |
| SrO + BaO | 3.0 | 5.8 | 6.4 | 2.0 | 6.6 | 2.9 | 2.0 | 10.0 |
| $6 \times [B_2O_3] - 21$ | −3.0 | −1.8 | −1.2 | 0.6 | −3.0 | 3.0 | 0.6 | −1.2 |
| $6 \times [B_2O_3] - 14$ | 4.0 | 5.2 | 5.8 | 7.6 | 4.0 | 10.0 | 7.6 | 5.8 |
| $-6 \times [B_2O_3] + 19$ | 1.0 | −0.2 | −0.8 | −2.6 | 1.0 | −5.0 | −2.6 | −0.8 |
| $-6 \times [B_2O_3] + 28$ | 10.0 | 8.8 | 8.2 | 6.4 | 10.0 | 4.0 | 6.4 | 8.2 |
| Average thermal expansion coefficient [$\times 10^{-7}/°$ C.] | 37.0 | 38.5 | 38.0 | 37.3 | (38.0) | 32.4 | (38.0) | (40.0) |
| Strain point [° C.] | 728 | (713) | (713) | (710) | (705) | (717) | (720) | (700) |
| Tg [° C.] | 762 | 768 | 768 | 765 | (760) | 772 | (775) | (755) |
| Specific gravity | 2.58 | 2.64 | 2.67 | 2.53 | (2.62) | 2.50 | (2.52) | (2.73) |
| Young's modulus [GPa] | 83.0 | 79.2 | 78.6 | 84.2 | (79.0) | 78.4 | (81.0) | (84.0) |
| $T_2$ [° C.] | 1632 | 1694 | 1689 | 1618 | (1710) | 1746 | (1680) | (1620) |
| $T_4$ [° C.] | 1275 | 1318 | 1319 | 1267 | (1350) | 1353 | (1320) | (1340) |
| Devitrification temp. [° C.] | 1288 | 1237 | 1287 | 1237 |  | 1325 |  |  |
| Photoelastic constant [nm/MPa/cm] | 27.0 | 28.0 | 27.6 | 27.5 | (29.1) | (29.2) | (29.0) | (27.0) |
| Thermal shrinkage amount [ppm] | 30.5 |  |  |  |  |  |  |  |

|  | Ex. 21 | Ex. 22 | Ex. 23 | Ex. 24 | Ex. 25 | Ex. 26 | Ex. 27 |
|---|---|---|---|---|---|---|---|
| $SiO_2$ | 64.4 | 63.8 | 65.0 | 66.0 | 66.8 | 65.5 | 66.0 |
| $Al_2O_3$ | 13.0 | 13.8 | 13.0 | 13.0 | 13.2 | 13.8 | 13.2 |
| $B_2O_3$ | 3.1 | 3.2 | 3.5 | 3.8 | 4.0 | 4.2 | 3.6 |
| MgO | 11.5 | 10.6 | 8.0 | 7.2 | 7.2 | 9.0 | 10.0 |
| CaO | 1 | 0 | 6.0 | 8.5 | 5.0 | 5.0 | 5.0 |
| SrO | 2.0 | 2.5 | 1.5 | 0.5 | 0.0 | 1.0 | 2.2 |
| BaO | 5.0 | 6.1 | 3.0 | 1.0 | 3.8 | 1.5 | 0 |
| MgO + CaO + SrO + BaO | 19.5 | 19.2 | 18.5 | 17.2 | 16.0 | 16.5 | 17.2 |
| SrO + BaO | 7.0 | 8.6 | 4.5 | 1.5 | 3.8 | 2.5 | 2.2 |
| $6 \times [B_2O_3] - 21$ | −2.4 | −1.8 | 0.0 | 1.8 | 3.0 | 4.2 | 0.6 |
| $6 \times [B_2O_3] - 14$ | 4.6 | 5.2 | 7.0 | 8.8 | 10.0 | 11.2 | 7.6 |
| $-6 \times [B_2O_3] + 19$ | 0.4 | −0.2 | −2.0 | −3.8 | −5.0 | −6.2 | −2.6 |
| $-6 \times [B_2O_3] + 28$ | 9.4 | 8.8 | 7.0 | 5.2 | 4.0 | 2.8 | 6.4 |
| Average thermal expansion coefficient [$\times 10^{-7}/°$ C.] | 40.2 | (41.3) | 39.9 | (38.5) | 37.6 | (35.2) | 35.6 |
| Strain point [° C.] | 693 | (712) | 704 | (704) | 707 | (708) | 714 |
| Tg [° C.] | 763 | (775) | 754 | (760) | 757 | (766) | 762 |
| Specific gravity | 2.68 | (2.71) | 2.61 | (2.53) | 2.60 | (2.53) | 2.51 |
| Young's modulus [GPa] | 84 | (82) | 84 | (82) | 83 | (83) | 86 |
| $T_2$ [° C.] | 1624 | (1634) | 1631 | (1636) | 1654 | (1641) | 1629 |
| $T_4$ [° C.] | 1281 | (1300) | 1281 | (1294) | 1299 | (1299) | 1283 |
| Devitrification temp. [° C.] | 1285 |  | 1235 |  | 1245 |  | 1295 |
| Photoelastic constant [nm/MPa/cm] | 26.9 | 26.6 | 27.2 | 28.4 | 27.9 | 28.7 | 27.8 |
| Thermal shrinkage amount [ppm] | 47.5 |  | 52.0 |  | 50.5 |  | 46.9 |

The glass substrate of Example 13 does not correspond to either of the above-mentioned non-alkali glass substrates 1 and 2 in view of the content of CaO and the total content of SrO and BaO, and accordingly, the photoelastic constant is high. The glass substrate of Example 14 does not correspond to either of the above-mentioned non-alkali glass substrates 1 and 2 in view of the total content of SrO and BaO, and accordingly, the photoelastic constant is high.

The glass substrate of Example 15 does not correspond to the above-mentioned non-alkali glass substrate 2 in view of $SiO_2$, MgO and SrO, and accordingly, the photoelastic constant, $T_2$ and $T_4$ are poor. The glass substrate of Example 16 does not correspond to the above-mentioned non-alkali glass substrate 2 in view of $SiO_2$, and accordingly, the photoelastic constant, $T_2$ and $T_4$ are poor. The glass substrate of Example 17 does not correspond to the above-mentioned non-alkali glass substrate 2 in view of MgO and CaO, and accordingly, the photoelastic constant is poor. The glass substrate of Example 18 does not correspond to either of the above-mentioned non-alkali glass substrates 1 and 2 in view of the total content of SrO and BaO, and accordingly, the viscosity is high.

The present invention has been described in detail with reference to specific embodiments thereof, but it will be apparent to one skilled in the art that various changes and modifications can be made without departing from the spirit and scope of the present invention.

The invention is based on Japanese Patent Application No. 2012-266106 filed on Dec. 5, 2012, the contents of which are incorporated herein by reference.

INDUSTRIAL APPLICABILITY

According to the present invention, it is possible to provide a non-alkali glass substrate which has a high strain point, a low specific gravity and a low photoelastic constant, and hardly causes problems such as color unevenness even when stress is applied thereto.

The invention claimed is:

1. A non-alkali glass substrate, having a strain point of 685° C. or higher and 750° C. or lower, an average thermal expansion coefficient at 50 to 350° C. of from $35 \times 10^{-7}$ to $43 \times 10^{-7}$/° C., a specific gravity of from 2.50 to 2.80, a photoelastic constant of 25 nm/MPa/cm or more and less than 29 nm/MPa/cm, and a temperature ($T_4$) at which viscosity reaches $10^4$ dPa·s of 1,250° C. or higher and lower than 1,350° C., and comprising, indicated by mol % on the basis of oxides,
63% or more and 68% or less of $SiO_2$,
12.2% or more and 14% or less of $Al_2O_3$,
0.5% or more and less than 3% of $B_2O_3$,
6.5% or more and 13% or less of MgO,
0% or more and less than 4% of CaO,
0% or more and 9% or less of SrO, and
0% or more and 10% or less of BaO,
wherein
MgO+CaO+SrO+BaO is from 15 to 20%, and
SrO+BaO is from 4 to 10%.

2. The non-alkali glass substrate according to claim 1, having a glass transition temperature of from 750 to 810° C.

3. The non-alkali glass substrate according to claim 1, having a devitrification temperature of 1,200° C. or higher and lower than 1,370° C., and a temperature ($T_2$) at which the viscosity reaches $10^2$ dPa·s of 1,600° C. or higher and lower than 1,710° C.

4. The non-alkali glass substrate according to claim 1, having a Young's modulus of from 76 to 90 GPa.

5. A non-alkali glass substrate, having a strain point of 685° C. or higher and 750° C. or lower, an average thermal expansion coefficient at 50 to 350° C. of from $35 \times 10^{-7}$ to $43 \times 10^{-7}$/° C., a specific gravity of from 2.50 to 2.80, a photoelastic constant of 25 nm/MPa/cm or more and less than 29 nm/MPa/cm, and a temperature ($T_4$) at which viscosity reaches $10^4$ dPa·s of 1,250° C. or higher and 1,335° C. or lower, and comprising, indicated by mol % on the basis of oxides,
63% or more and 67% or less of $SiO_2$,
12.2% or more and 14% or less of $Al_2O_3$,
3% or more and less than 4.3% of $B_2O_3$,
7% or more and 13% or less of MgO,
0% or more and 9% or less of CaO,
0% or more and 3% or less of SrO, and
0% or more and 7% or less of BaO,
wherein
MgO+CaO+SrO+BaO is from 15 to 20%, and
with the proviso that the CaO, SrO, and BaO concentrations are within the above-recited ranges and are linked to the $B_2O_3$ concentration according to the following expressions:
CaO is from $(6 \times B_2O_3 - 21)$% to $(6 \times B_2O_3 - 14)$%, and
SrO+BaO is from $(-6 \times B_2O_3 + 19)$% to $(-6 \times B_2O_3 + 28)$%.

6. The non-alkali glass substrate according to claim 5, having a glass transition temperature of from 740 to 790° C.

7. The non-alkali glass substrate according to claim 5, having a devitrification temperature of 1,200° C. or higher and lower than 1,350° C. and a temperature ($T_2$) at which the viscosity reaches $10^2$ dPa·s of from 1,600° C. or higher and 1,730° C. or lower.

8. The non-alkali glass substrate according to claim 5, having a Young's modulus of from 76 to 88 GPa.

* * * * *